Oct. 11, 1938.　　　H. R. GIBBONS ET AL　　　2,133,024
JOURNAL BOX
Filed May 19, 1936　　2 Sheets-Sheet 1
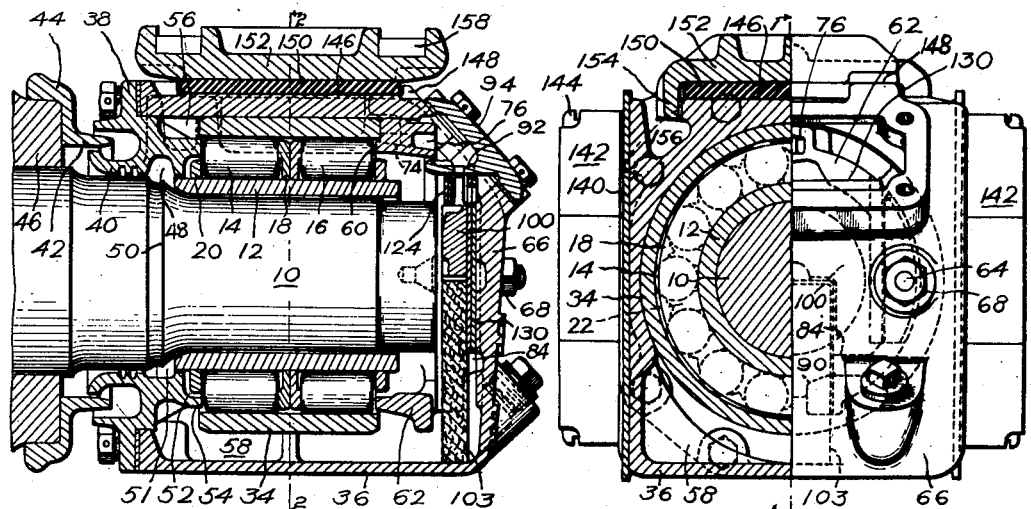
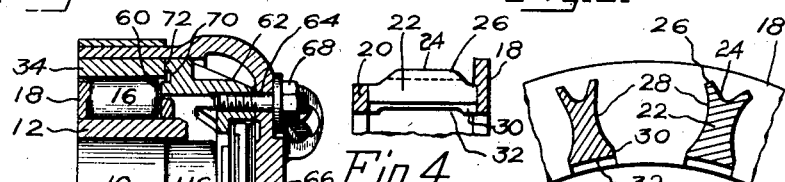
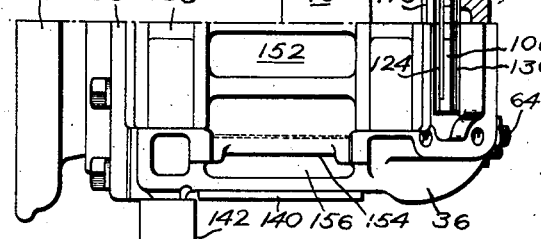
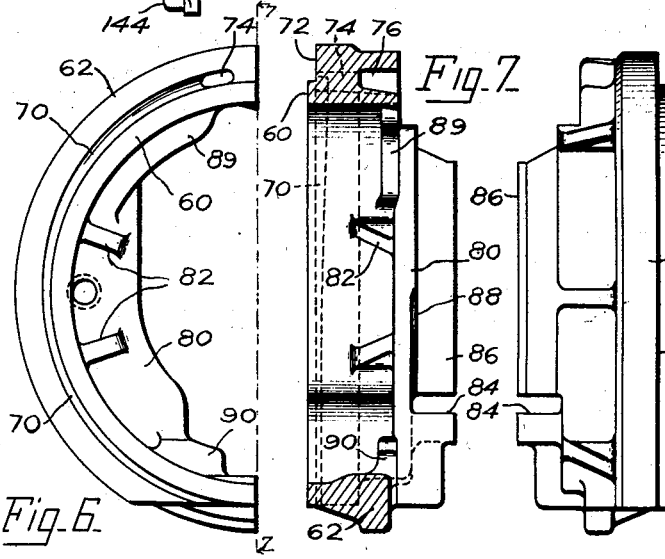
INVENTORS:
HAROLD R. GIBBONS,
RICHARD J. BRITTAIN JR.
BY Gales P. Moore
THEIR ATTORNEY.

Oct. 11, 1938.  H. R. GIBBONS ET AL  2,133,024
JOURNAL BOX
Filed May 19, 1936  2 Sheets-Sheet 2
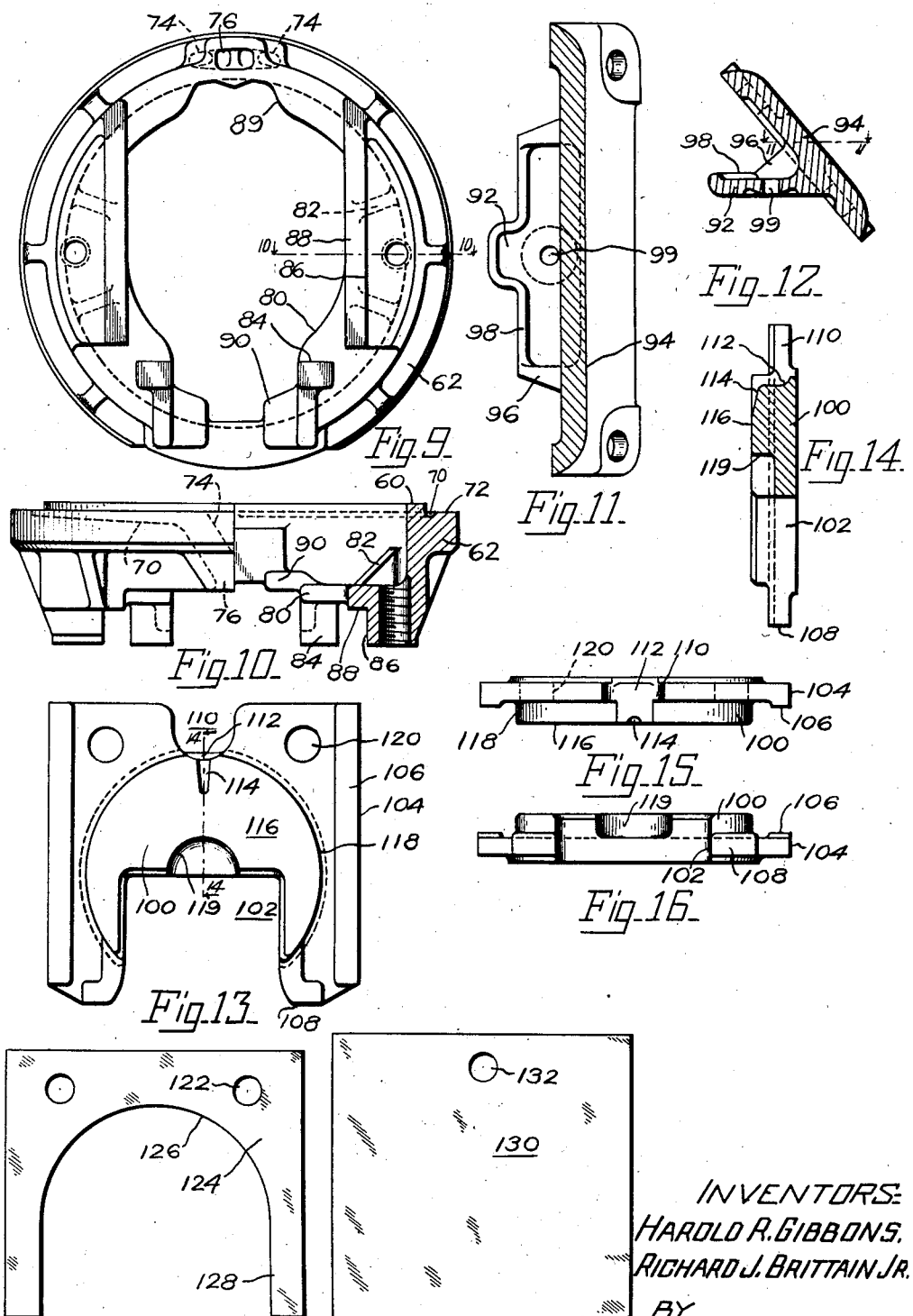
INVENTORS:
HAROLD R. GIBBONS,
RICHARD J. BRITTAIN JR.
BY Gales P. Moore
THEIR ATTORNEY.

Patented Oct. 11, 1938

2,133,024

UNITED STATES PATENT OFFICE 2,133,024

JOURNAL BOX

Harold R. Gibbons, Chatham, and Richard J. Brittain, Jr., Bloomfield, N. J., assignors to General Motors Corporation, Detroit, Mich., a corporation of Delaware Application May 19, 1936, Serial No. 80,574

25 Claims. (Cl. 308—180)

This invention relates to journal boxes and comprises all of the features of novelty herein disclosed. An object of the invention is to provide improved means for journalling a shaft in a housing. Another object is to provide an improved thrust construction for limiting the endwise movement of a shaft or axle and providing for wear. Another object is to provide improved means for collecting lubricant from the journal bearing and delivering it to the thrust bearing.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a vertical sectional view of a journal box, the section being taken on line 1—1 of Fig. 2.

Fig. 2 is an end view with one half in section in the plane of line 2—2 of Fig. 1.

Fig. 3 is partly a plan view and partly a horizontal section of the box.

Fig. 4 is an axial cross-sectional view of a portion of a cage or separator.

Fig. 5 is a radial cross-sectional view, enlarged, of the cage or separator.

Fig. 6 is a rear end view of one half of a retaining ring.

Fig. 7 is an axial sectional view of the retaining ring on line 7—7 of Fig. 6.

Fig. 8 is a side view of the retaining ring.

Fig. 9 is a front end view of the retaining ring.

Fig. 10 is a top plan view of Fig. 9 with one half in horizontal section on line 10—10 of Fig. 9.

Fig. 11 is a horizontal sectional view of a cover.

Fig. 12 is a vertical central cross-sectional view of the cover.

Fig. 13 is a rear end view of a thrust block.

Fig. 14 is a vertical sectional view on line 14—14 of Fig. 13.

Fig. 15 is a top plan view of Fig. 13.

Fig. 16 is a bottom plan view of Fig. 13.

Fig. 17 is a side view of a spacing plate.

Fig. 18 is a side view of a different kind of spacing plate.

The numeral 10 indicates a shaft or axle on which is pressed a raceway sleeve 12 for two rows of rolling elements 14 and 16. Each row has its rollers spaced apart by a cage or separator comprising end rings 18 and 20 united by cross bars 22, the end rings 18 being higher radially than the end rings 20 and both of them running on the sleeve 12. The cage or separator is preferably made of bronze and the cross bars have their intermediate portions 24 deepened to provide displaceable lips or tongues 26. The cross bars have curved surfaces 28 which have a radius slightly larger than that of the rollers and the tongues 26 are bent over after the rollers are inserted in the pockets from the outside. The surfaces 28 terminate at the radial faces 30 and the intermediate portions of the cross bars are recessed as at 32 to clear the sleeve 12 and so prevent rubbing off the oil.

The rollers also run in an outer raceway sleeve 34 in a housing or journal box 36. The box is closed at the inner or rear end by an end cap 38 which is bolted on to the box against a gasket. The cap has a projecting flange 40 which is curved outwardly at the end to form a drain groove. Into the groove projects a flange 42 on a guard ring 44 which is secured to a wheel hub 46 carried by the axle. Internally, the end cap has an oil collecting groove 48 which receives oil thrown off from a rib 50 on the axle and drains such oil through a hole 51 into the bottom of the box. The end cap also has an annular recess 52 to receive the end ring 20 of the cage and outside of this recess there is an annular projection or flange 54 which has its end surface hardened to engage the ends of the adjacent row of rollers to limit endwise movement thereof. The projection 54 extends within the projecting ends of the raceway sleeve 34 so that it lies between the end portion of such sleeve and the cage ring 20. Outside of the projection 54 is a recess 56 into which surplus oil thrown out by the rollers can be conducted to a lubricant reservoir 58 at the bottom of the box.

At the other end of the bearing there is an annular projection or flange 60 carried by a retaining ring 62, the projection having a hardened abutment face in close proximity to the adjacent ends of the rollers 16 to limit axial movement thereof. The flange enters the sleeve 34 and lies between the end ring 20 and the adjacent end portion of the sleeve. The retaining ring 62 has fastened to it screw studs 64 extending through holes in an end wall 66 of the box to receive clamping nuts 68 and washers. Just outside of the projection or flange 60, the retaining ring has an oil collecting groove 70 open laterally towards the rollers and, outside of the groove, is a face 72 which forms an abutment for the raceway sleeve 34. The oil groove is discontinuous at the top portion of the retaining ring (see Figs. 6, 7, 9 and 10) to provide a dam at this point and at the sides of the dam there are openings or ports 74 extending through the retaining ring from the groove 70, the two ports leading into a single port 76 at the top. The oil groove 70 is of varying cross section from the horizontal center line to the ports 74, the cross section gradually becoming deeper and wider as it approaches the ports 74. Below the center line the groove 70 is of uniform cross section until it breaks through the ring at the slabbed off lower portion thereof.

As the rollers 16 roll around between their raceways, due to rotation of the axle in either direction, surplus oil is thrown laterally and circumferentially into the groove 70 and, when obstructed by the inclined wall of the port 74, the oil will be delivered into the single port 76 and conducted to a thrust block, as will appear, to help lubricate the latter. The ports 74 converge from the groove towards the single port 76 so that the circumferentially moving oil is not abruptly stopped but is deflected towards the end of the box. Each port thus has a deflecting wall which inclines crosswise with respect to the shaft and forms an obtuse-angled continuation of the groove. The increasing width and depth of the groove 70 above the center line provides room for the oil as it gradually accumulates from the moving rollers.

The retaining ring has internally projecting ribs 80 which are curved below the center line and straight above it, these ribs being reinforced by bracing webs 82. The ribs have lugs 84 projecting towards the end wall of the box to provide spaced supports for a thrust block as will appear. The ring carries vertically extending guide rails 86 projecting towards the end wall 66 of the box and held against the latter by the clamping screws 64, such guide rails locating a thrust block laterally. There are also abutment faces 88 on the ribs 80 to provide abutments for the thrust block or for spacing plates that are used in conjunction with the latter. Near the top of the ring there is a pair of ribs 89 providing a recess between them and near the bottom of the ring is another pair of ribs 90 forming a recess between them. A shelf 92 projects into the upper recess, such shelf being formed on a cover 94 (Figs. 1, 11, and 12) which is bolted to the inclined rim of an opening in the journal box. The shelf provides a lubricant collecting pan which is bounded by bracing end walls 96 and side walls or rims 98. Oil drops into the pan from the port 76 and then passes through an opening 99 in the shelf.

Interposed between the end of the axle and the end wall of the box, and directly beneath the opening 99 is a thrust block 100. The thrust block (see Figs. 13, 14, 15 and 16) is composed of two portions, the larger portion being generally square in outline except for a bottom slot or notch 102 which receives a wick 103, the wick lifting oil by capillary action from the bottom of the box to the thrust block and axle which occasionally come in contact. The thrust block has lateral projections with vertical side edges 104 adapted to fit between the guide rails or projections 86 of the retaining ring, and there are vertical abutment faces 106 to abut against the faces 88 or against spacing plates which may be interposed between them and such faces as will appear. The thrust block has depending legs 108 at the sides of the notch 102 and these are adapted to rest on the above mentioned lugs 84. The top of the thrust block has a notch 110 leading to a recess 112 by which oil is conducted to a V-shaped notch 114 formed in the thrust face 116 of the thrust block. The thrust face has its outer surface 118 arcuate and there is a semicylindrical notch 119 at its interior and just above the top of the wick. From the foregoing it will be seen that the oil which drops through the opening 99 will proceed downwardly into the recess 112 and drain through the notch 114 to the face 116 of the thrust block, the oil thus supplementing the oil supplied by the wick. A pair of finger holes 120 are also provided in the thrust block to facilitate insertion and removal of the block when the cover 94 is removed.

The finger holes 120 of the thrust block are adapted to register with finger holes 122 on spacing plates 124 (see Figs. 1, 3 and 17) which are provided with internal recesses formed by arcuate surfaces 126 adapted to surround the smaller and curved portion 118 of the thrust block, the spacing plates having downwardly extending legs 128 below the center line. The spacing plates 124 are initially interposed between the faces 106 of the thrust block and the above mentioned abutment faces 88 of the retaining ring, being supported by the lugs 84 until the thrust block wears whereupon one is removed to make room for an additional spacing plate at the other side of the thrust block. On the other side of the thrust block are spacing plates 130 having a finger hole 132. The spacing plates 130 may be substantially square and are interposed between the thrust block and the end wall of the box, the central lower portion of the innermost plate 130 engaging and confining the wick.

The spacing plates are of such selected thickness that, when installed on the opposite sides of the thrust block, they, with the thrust block, will be closely confined but with sufficient clearance to permit removal in an upward direction through the opening in the housing without loosening nuts 68 on studs 64. Spacing plates 124 may be removed and additional spacing plates 130 inserted, or vice versa, for the purpose of adjusting clearance between thrust face 116 and end of axle 10.

The opposite sides of the box (see Figs. 2 and 3) are provided with suitable pedestal liners 140 welded to it. Other liners 142 are welded to pedestal guide ribs 144. The top of the box has a flat supporting face 146 extending across it and provided with end ribs 148 forming a recess to receive and hold cushion 150 which may be of rubber. Resting on the top of the cushion is a seat plate 152 having side flanges 154 projecting downwardly into cavities 156 in the top of the box near the sides, the flanges straddling the walls where the supporting face 146 terminates and thus holding the seat plate from shifting transversely of the box. The flanges prevent the seat plate from shifting longitudinally of the box by engagement with the end walls of the cavities. The top of the seat plate is provided with suitable seats 158 adapted to support the usual equalizer bars of the car frame.

We claim:
1. In a device of the character indicated, a housing having an internal bearing surface, a shaft, antifriction rolling elements between the shaft and the bearing surface of the housing, separating means for the rolling elements and comprising end rings engaging the ends of the rolling elements, retaining members secured to the housing beyond the bearing surface, the retaining members having flanges projecting axially over and surrounding the end rings and extending inside of the bearing surface, and the flanges having abutment faces adapted for direct engagement with the ends of the rolling elements to limit endwise movement of the latter; substantially as described.

2. In a device of the character indicated, a housing, a shaft, a bearing sleeve in the housing, antifriction rolling elements between the shaft and the sleeve, the sleeve projecting beyond the ends of the rolling elements, separating means for the rolling elements and comprising end rings engaging the ends of the rolling elements, retaining members engaging the ends of the sleeve and having flanges projecting axially inside the sleeve, and said flanges surrounding the end rings and having abutment faces for direct engagement by the end faces of the rolling elements; substantially as described.

3. In a device of the character indicated, a housing, a shaft, antifriction rolling elements arranged in two rows between the shaft and the housing, a separator for each row, each separator comprising a pair of end rings of different radial height, the higher end rings being located at adjacent ends of the rolling elements and the shallower ones being at the remote ends of the rolling elements, and retaining rings having axially extending projections overlapping the shallower end rings and adapted for direct engagement with the ends of the rolling elements; substantially as described.

4. In a device of the character indicated, a housing, a shaft, a raceway sleeve on the shaft, rolling elements arranged in two rows between the sleeve and the housing, the sleeve projecting beyond the ends of the rolling elements, a pair of separators, each separator comprising a pair of end rings of different radial height, the higher end rings being located at adjacent ends of the rolling elements and the shallower end rings being located at the remote ends of the rolling elements and supported by the projecting portions of the sleeve beyond the ends of the rolling elements, and retaining rings secured to the housing and having annular flanges projecting axially therefrom and surrounding the shallower end rings in proximity to the ends of the rolling elements for direct contact therewith; substantially as described.

5. In a device of the character indicated, a housing, a shaft, a bearing sleeve in the housing and a bearing sleeve on the shaft, rolling elements between the sleeves and arranged in two rows, the sleeves projecting beyond the ends of the rolling elements, a separator for each row of rolling elements and comprising a pair of end rings of different radial height, the higher end rings abutting against one another and the shallower end rings running on the inner raceway sleeve beyond the ends of the rolling elements, retaining rings engaging the opposite ends of the outer raceway sleeve, and each retaining ring having an axially projecting flange of reduced diameter entering the outer raceway sleeve and lying between the latter and the shallower end ring, the end of the flange engaging flatwise against the ends of the rolling elements, substantially as described.

6. In a device of the character indicated, a housing provided with a raceway, a shaft provided with a raceway, rolling elements between the raceways, a retaining ring in the housing near the ends of the rolling elements, the retaining ring having an arcuate groove adjacent to the outer raceway and open laterally towards the rolling elements to receive oil therefrom, and means for damming the end of the groove and conducting the oil through the retaining ring, substantially as described.

7. In a device of the character indicated, a housing provided with a raceway, a shaft provided with a raceway, rolling elements between the raceways, a retaining ring in the housing near the ends of the rolling elements, the retaining ring having an arcuate groove adjacent to the outer raceway and open laterally towards the rolling elements to receive oil therefrom, and means for conducting oil through the ring, said means comprising a port with a deflecting wall which inclines crosswise with respect to the shaft and forms an obtuse-angled continuation of the groove, substantially as described.

8. In a device of the character indicated, a housing provided with a raceway, a shaft provided with a raceway, rolling elements between the raceways, a retaining ring in the housing near the ends of the rolling elements, the retaining ring having a pair of arcuate grooves adjacent to the outer raceway and open laterally towards the rolling elements, and the retaining ring having a dam between the ends of the grooves with a pair of ports on opposite sides of said dam, substantially as described.

9. In a device of the character indicated, a housing provided with a raceway, a shaft provided with a raceway, rolling elements between the raceways, a retaining ring in the housing near the ends of the rolling elements, the retaining ring having an arcuate groove adjacent to the outer raceway and open laterally towards the rolling elements, the groove being of gradually increasing cross section in one direction to accumulate oil thrown from the rolling elements, substantially as described.

10. In a device of the character indicated, a housing provided with a raceway, a shaft provided with a raceway, rolling elements between the raceways, a retaining ring in the housing near the ends of the rolling elements, the retaining ring having an arcuate groove adjacent to the outer raceway and open laterally towards the rolling elements, the groove being of gradually increasing cross section in one direction to accumulate oil thrown from the rolling elements, and means for blocking the end of the arcuate groove and deflecting oil through the retaining ring, substantially as described.

11. In a device of the character indicated, a housing provided with a raceway, a shaft provided with a raceway, rolling elements between the raceways, a retaining ring in the housing and having an axially projecting flange adapted to directly engage and limit endwise movement of the rolling elements, the flange extending within and being spaced from the outer raceway, and the ring having an arcuate groove outside of the flange and open towards the outer raceway and the rolling elements, substantially as described.

12. In a device of the character indicated, a housing, a shaft, a bearing between the housing and the shaft, a ring in the housing to collect oil from the bearing, a thrust member opposing the end of the shaft, and a shelf in the housing above the thrust member and having means to receive oil from the ring and deliver it to the thrust member, substantially as described.

13. In a device of the character indicated, a housing, a shaft, a bearing between the housing and the shaft, a ring in the housing and having means on one side to collect oil from the bearing, the ring having a discharge port on the other side, a thrust member opposing the end of the shaft, and a shelf in the housing and having an oil collecting pan adapted to receive oil from said discharge port and deliver it to the thrust member, substantially as described.

14. In a device of the character indicated, a housing, a shaft, a bearing between the housing and the shaft, a ring in the housing to collect oil from the bearing, the ring having a discharge port, a thrust member opposing the end of the shaft, a cover secured to the housing and having a shelf extending under the discharge port to receive oil therefrom, and the shelf having means to deliver oil to the thrust member, substantially as described.

15. In a device of the character indicated, a housing provided with a bearing surface, a shaft, rolling elements between the shaft and the bearing surface, a thrust member opposing the end of the shaft, a member having an arcuate guide surface to engage the ends of the rolling elements, the member having an arcuate groove outside of the arcuate guide surface and close to the bearing surface, the arcuate groove being open laterally to the rolling elements, means for conducting lubricant from the groove to the thrust member, and means for raising lubricant from the lower portion of the housing to the thrust member, substantially as described.

16. In a device of the character indicated, a housing, a shaft journalled in the housing, a thrust block having a thrust portion facing towards the end of the shaft and another portion of larger size facing towards the housing, a spacing plate having the general outline of the larger portion of the thrust block and adapted to be interposed between said larger portion and the housing to locate the thrust block farther from the housing as wear occurs, and a spacing plate having a recess to receive the thrust portion of the block when the spacing plate is initially placed in the housing, substantially as described.

17. In a device of the character indicated, a housing, a shaft journalled in the housing, a thrust block having a thrust portion facing towards the end of the shaft and another portion of larger size facing towards the housing, spacing plates of two kinds adapted to engage opposite sides of the thrust block, both kinds of spacing plates having the general outline of the larger portion of the thrust block and one kind of said plates being internally recessed to straddle the thrust portion of the block, substantially as described.

18. In a device of the character indicated, a housing, a shaft journalled in the housing, a thrust block interposed between the end of the shaft and the housing, spacing plates of two kinds adapted to engage opposite sides of the thrust block, and one kind of plate having an internal recess to straddle a portion of the thrust block, substantially as described.

19. In a device of the character indicated, a housing, a shaft journalled in the housing, a thrust block interposed between the shaft and the housing, spacing plates adapted to be interposed between the thrust block and the housing, and means for supporting other spacing plates at the other side of the thrust block, substantially as described.

20. In a device of the character indicated, a housing, a shaft journalled in the housing, a thrust block interposed between the shaft and the housing, spacing plates adapted to be interposed between the thrust block and the housing, and a ring supported in the housing around the shaft and having means projecting towards the housing to support the spacing plates, substantially as described.

21. In a device of the character indicated, a housing, a shaft journalled in the housing, a ring surrounding the shaft and having extensions projecting towards the end wall of the housing, a thrust member supported by the extensions and interposed between the shaft and the end wall of the housing, and means for clamping the ring to the end wall of the housing, substantially as described.

22. In a device of the character indicated, a housing, a shaft journalled in the housing, a ring surrounding the shaft and having spaced guide rails projecting therefrom into contact with the end wall of the housing, and a thrust block fitting between the guide rails and interposed between the shaft and the end wall, substantially as described.

23. In a device of the character indicated, a housing, a shaft journalled in the housing, a ring surrounding the shaft and having spaced guide rails projecting therefrom into contact with the end wall of the housing, the ring also having abutment faces facing towards said end wall, and a thrust block fitting between the guide rails and having portions interposed between the abutment faces and the end wall of the housing, substantially as described.

24. In a device of the character indicated, a housing, a shaft journalled in the housing, a ring secured to the housing and having flanges forming a groove with the end wall of the housing, the housing having an opening in line with the groove, a thrust block interposed between the end of the shaft and the end wall of the housing, spacing plates at opposite sides of the thrust block, the thrust block and the spacing plates substantially filling the groove and being removable through the housing opening, and the removable spacing plates providing means to change the position of the thrust block widthwise of the groove and leaving the thrust block free for removal from the groove and through the housing opening, substantially as described.

25. In a device of the character indicated, a housing, a shaft journalled in the housing, a thrust block interposed between the shaft and the housing and having a slot cut through its lower portion, a lubricating wick entering said slot, and spacing plates interposed between the thrust block and the end wall of the housing, said plates extending across the notch and engaging the wick, substantially as described.

HAROLD R. GIBBONS.
RICHARD J. BRITTAIN, Jr